Sept. 12, 1939.  H. LIBBERTON  2,172,564
TABLET FOR USE IN FABRICATING ELECTROTYPES
Original Filed May 4, 1934   2 Sheets-Sheet 1
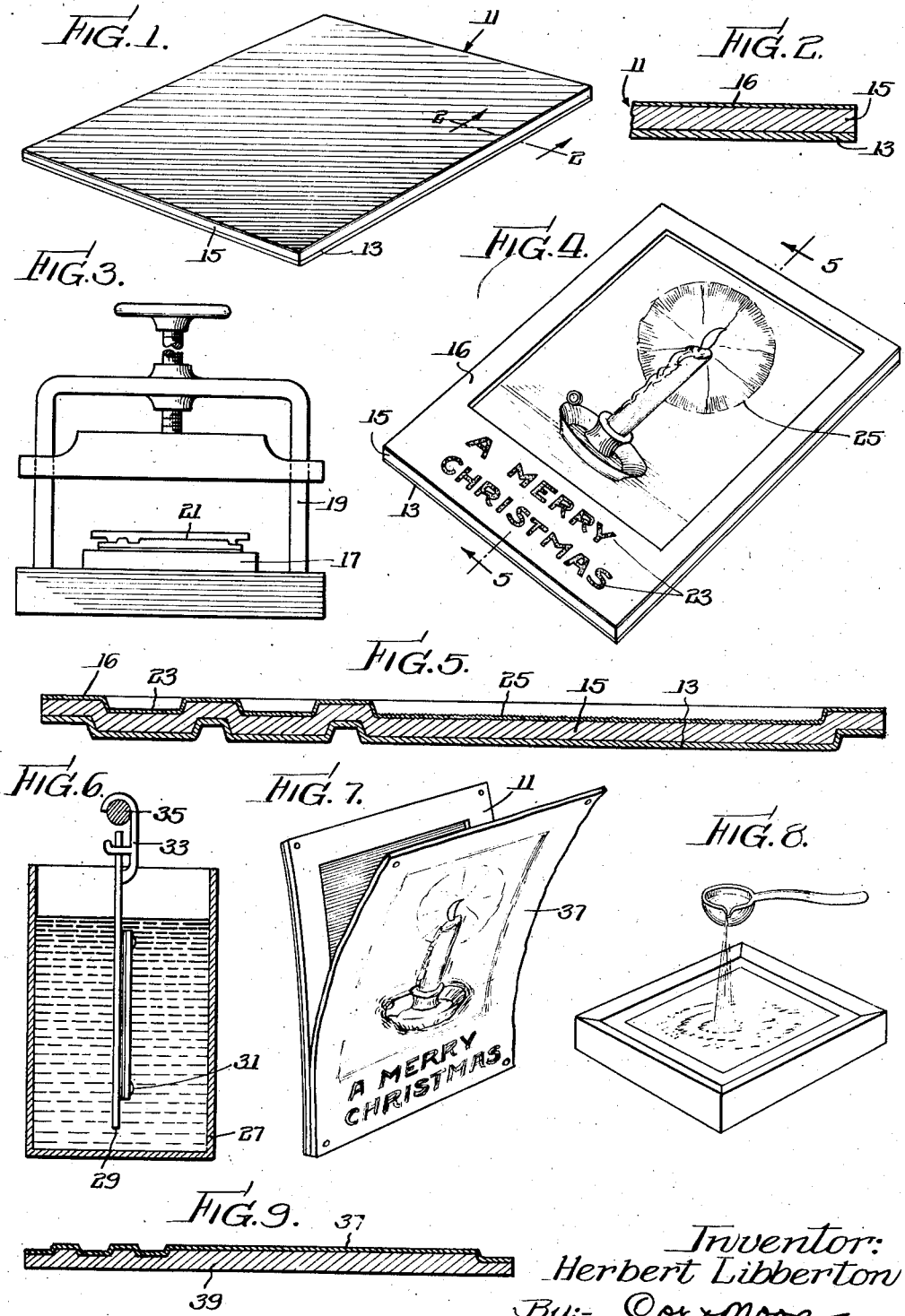
Inventor:
Herbert Libberton
By:- Cox & Moon
attys.

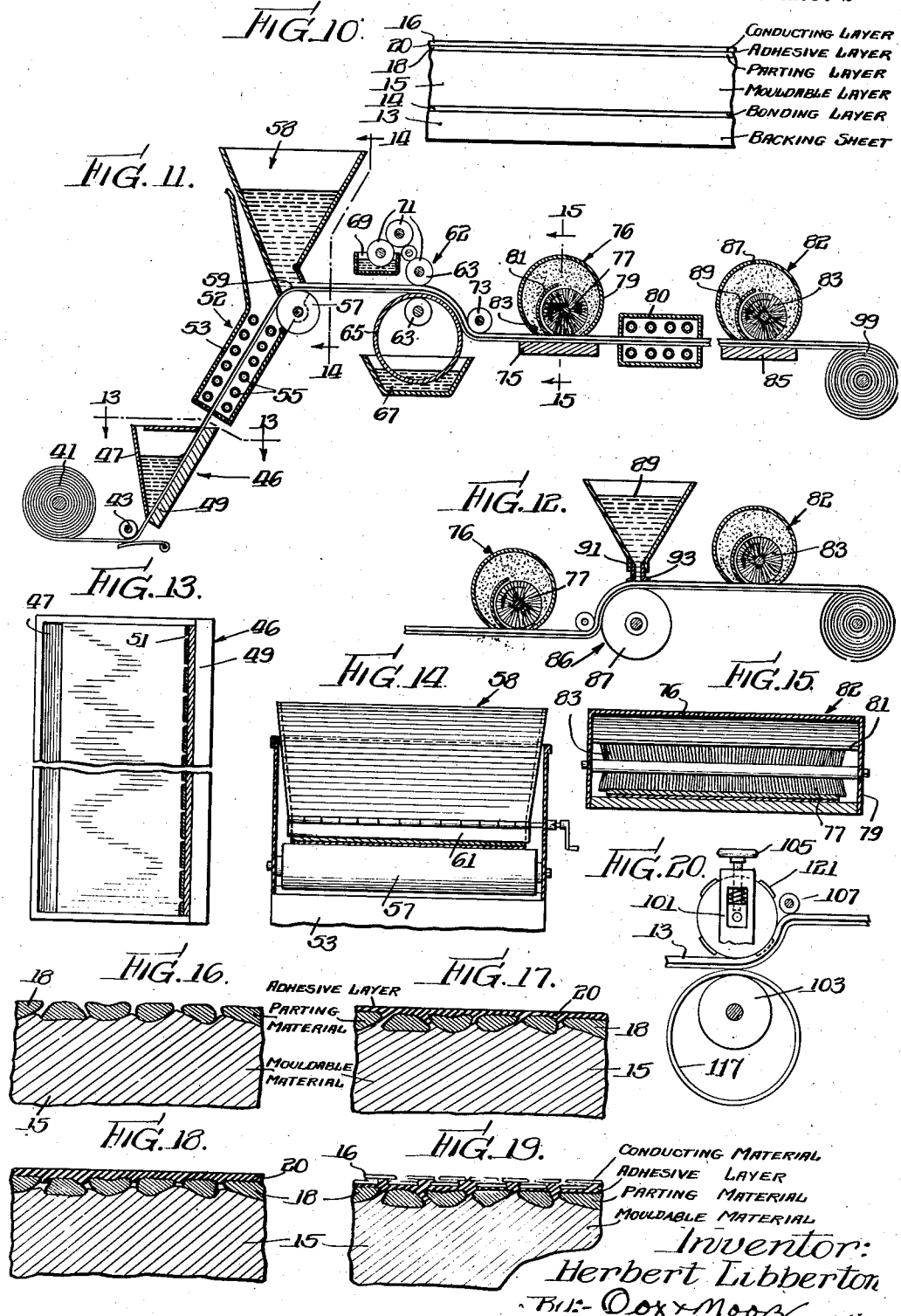

Patented Sept. 12, 1939

2,172,564

UNITED STATES PATENT OFFICE 2,172,564

TABLET FOR USE IN FABRICATING ELECTROTYPES

Herbert Libberton, Chicago, Ill., assignor, by direct and mesne assignments, to Tenak Products Company, Chicago, Ill., a corporation of Illinois Application May 4, 1934, Serial No. 723,940
Renewed June 20, 1938

21 Claims. (Cl. 154—46.5)

My invention relates in general to printing and has more particular reference to means for and method of making electrotype printing plates, the invention having special reference to a moldable tablet, for use in the fabrication of electrotypes, and to methods and apparatus for making the tablet, the same being an improvement and continuation in part of the invention set forth in my co-pending application, Serial Number 647,504, filed December 16, 1932.

At present, electrotype plates are made by electroplating the surface of wax or lead tablets in which the image to be reproduced has previously been molded.

Among the difficulties and disadvantages encountered in using lead tablets, is the enormous pressure required to mold the lead, which prevents set-up type from being directly molded in the lead tablet, consequently, as is well known in the art, it is not practical to mold lead tablets directly with a so-called "mixed form", comprising set-up type and other kinds of form, such as previously prepared zinc etchings, half-tones, and the like, which can be used for lead molding. Another distinct disadvantage encountered in molding lead tablets is the powerful presses required in making the impression. It is also virtually impossible commercially to transport the relatively soft, heavy lead plates after molding as by mail, freight, or express, in case it may be desired to electroplate the molded tablet at a place other than where the tablet is impressed. Unless extraordinary care is taken in packing and transporting the tablets, they will be irreparably damaged in transit and rendered unfit for use. The same disadvantage exists where the tablets are of wax, which, being fairly soft, cannot successfully withstand the shocks and jars of transportation either before or after being molded, but must be handled with care and plated immediately.

Among the many other difficulties and disadvantages encountered in using wax tablets is the expense of making the tablets in the shop where used, involving, as it does, the mussy and untidy operation of applying heated wax to a backing plate; the shaving of the wax to proper thickness after application; the labor and expense of maintaining an oven to flash the plate to render the wax soft just before the tablet is placed in the press; the several expert processing steps performed upon the tablet after pressing, including shaving, flashing, building, and graphitizing the tablet in order to condition it for the plating bath; the necessary heating of the tablet and plate in order to strip them apart after the tablet has been plated; and the fact that the wax does not receive an absolutely true impression because its composition and temperature are not and can not be maintained uniform throughout the tablet no matter how carefully controlled; and because the processing steps of shaving, flashing, building, and graphitizing distort the impressed tablet, however slightly, before it is plated. Graphitizing also is a dirty, mussy, and untidy process.

An important object of the invention, therefore, is to provide a molding plate or tablet, more especially adapted for electroplating, which can be molded cold under relatively low pressures to take a clear, accurate, and undistorted impression from any kind of form, matrix, or die which may include set-up type, engravings, etchings, half-tones, or any other form, to provide a tablet which requires no "building" or other processing treatment after molding to condition it for plating; to provide a tablet which is inexpensive to manufacture, light in weight, easily handled, and commercially transported either before or after impression, which may be stored without deterioration and which, for these reasons, can be manufactured at a central factory and shipped to the customer ready for pressing and then may be sent to a remote electroplating plant without danger of damage or deterioration in transit.

Another important object is to eliminate the various difficulties which arise in electrotyping because of the inherent disadvantages of using lead or wax as a molding and plating medium, including the dusty and dirty conditions inherent to the necessary graphitizing step when wax molding tablets are used.

Another important object is to provide a thin flexible, yet self-supporting, tablet adapted to be molded in cold condition to receive and accurately hold an impression in spite of minor deflection imparted thereto in handling the plate after molding.

Another object is to provide a relatively thin molding tablet for use in making electrotypes, which can be deformed throughout its entire thickness to take the general outline of a form and which in its surface will take and hold the specific impression of the form, and which is sufficiently self-supporting to hold its shape without distortion after being molded.

Another object resides in the method of molding a tablet for electrotyping, which consists in molding a relatively thin, yet stiff and self-supporting plate to the general shape of the matrix, while simultaneously making a specific surface impression in a molding layer carried by the backing plate.

Another object is to provide a moldable tablet stiff enough to remain self-supporting; flexible enough to absorb minor deflection without distortion, moldable throughout its entire thickness to take the general contour of a molding form, and having a relatively inelastic surface adapted to receive and hold the specific imprint of the form.

Another important object is to provide a composite molding tablet for use in electrotyping and including a thin backing plate adapted to be distorted by a molding form and after distortion to retain its shape by absorbing minor deflections, such as may occur in ordinary careful handling, without acquiring a permanent set, and having a relatively inelastic moldable surface thereon capable of receiving accurate impressions from a form of any character.

Another object resides in utilizing a thin sheet of annealed metal, such as copper or aluminum, as the relatively stiff backing plate.

Another object is to provide means for and method of molding the strip continuously.

Another object is to provide a molding tablet having a molding surface of relatively soft moldable material adapted to receive a specific surface imprint from a molding form backed with a relatively stiff material adapted to be deformed to the general contour of the form and to support the molding surface against distortion as it is stripped from the form.

Another object is to apply an infinitely thin layer of electrical conducting material, preferably in finely divided condition, on the surface of the tablet to enable the reproduction, on said surface, of the finest shadow impressions at pressures sufficient only to mold the impression in the tablet and without requiring additional pressure to deform the conducting material.

Another important object resides in providing a new and improved material for use, more particularly, in making molds for electrotyping.

Another important object is to utilize a wax, together with a toughening medium, such as rubber or balata, in a moldable tablet of the character described.

Another important object is to utilize a wax, together with a resilient gum, such as rubber, or balata, as a toughening agent, in a moldable tablet of the character described.

Another important object is to provide a molding composition, including waxes and a toughening agent, together with a medium for increasing the adhesive qualities of the composition when hot so as to facilitate adhesion of the material on a backing member.

Another object is to adhere a molding compound on a backing by interposing therebetween a bonding layer strongly adhesive to both the backing and the compound.

Another object resides in applying a parting medium in the moldable surface of the composition to facilitate stripping of the electrotype from the molded form.

Another object resides in using powdered metals, such as copper, bronzes, or mica dust as a parting material.

Another important object is to apply an electrical conducting medium on the surface of the tablet overlying the parting medium and to securely adhere the conducting medium in place.

Another important object is to provide a suitable apparatus for building up the tablet as a continuous process.

Another important object resides in providing methods of building up the tablet including the adhering of the moldable layer on the backing sheet, the parting layer on the moldable layer and the conducting layer on the parting layer, and including the application of layers of uniform thickness and smooth fine surface texture.

Another object resides in annealing the backing sheet during the application of the layers.

Still another object resides in the reorganization and simplification of electrotyping methods and technique through the use of my new molding material.

Numerous other objects and advantages of the invention will be apparent from the following description, which, taken in connection with the accompanying drawings, discloses preferred embodiments of the invention.

Referring to the drawings:

Figure 1 is a perspective view of a molding tablet embodying my invention;

Figure 2 is a section taken along line 2—2 in Figure 1;

Figure 3 is a diagrammatic view of a press illustrating a preferred mode of molding the material;

Figure 4 is a perspective view of a piece of the material as impressed and ready for plating;

Figure 5 is a section taken substantially along line 5—5 in Figure 4;

Figure 6 is a sectional view of a plating bath showing one way of electroplating the molded tablet;

Figure 7 is a perspective showing how the plated reproduction or electrotype is stripped from the tablet;

Figure 8 illustrates the application of a backing to the electrotype;

Figure 9 is a section taken through the electrotype as backed with lead and ready for blocking;

Figure 10 is an enlarged section through a tablet embodying my present invention;

Figure 11 is a diagrammatic view of apparatus for building up the tablet in a continuous process;

Figure 12 illustrates a modified form of a portion of the tablet building apparatus;

Figures 13, 14, and 15 are sectional views taken substantially along lines 13—13, 14—14, and 15—15, respectively in Figure 11;

Figures 16, 17, 18, and 19 are greatly enlarged sectional views of the surface portions of the tablet at various stages in its fabrication; and Figure 20 is a diagrammatic view of a continuously operating press for molding the sheet material continuously.

To illustrate my invention, I have shown on the drawings, a tablet 11 made in accordance with the teachings of my present invention and adapted to accurately receive, in its surface, impressions especially well suited for electrotyping. The tablet is relatively thin so that it may be deformed throughout its entire thickness in order to receive the general impression of the molding form and to accommodate the material displaced by the form without causing it to bulge upwardly of the surface of the plate and thus effect the specific surface configuration impressed by the form. The tablet is stiff enough to be self-supporting and is resilient enough to absorb minor deflections without becoming distorted so that the portions containing the specific impression will be supported substantially without distortion as the tablet is released from the molding form and the tablet after molding may be handled and transported without particular care and without distortion. The tablet also in its surface is moldable to receive the specific imprint of the molding form or matrix and is inelastic enough to retain an imprint pressed therein, however fine the imprint may be.

The deformed surface of the tablet is adapted to be electroplated, and the tablet is adapted to release the shell so deposited on its surface without adhering any deleterious materials on the shell surface and thereby causing blemishes therein after the same is later used as an electrotype. To this end, I prefer to provide the tablet at or near its surface with parting means having the function to promote a clean parting between the surface of the sheet and the plated shell. I prefer also to apply on the surface of the tablet an electrical conducting material, preferably in finely divided condition, as a film substantially thinner than the finest printing impressions, i. e. "shadow dots" which may be molded on the tablet in order to promote a rapid and uniform deposit of material thereon in the shell-forming operation and at the same time permit the finest impressions to be formed on the tablet without requiring excessive molding pressures to deform the conducting layer.

The tablet may be made in several ways and of various materials. It may be of homogeneous structure in which the material has the requisite characteristics to enable the tablet to be formed as heretofore described. Preferably, however, the tablet is of laminated structure wherein the surface comprises a layer of relatively soft material suitable to receive and retain the specific form imprint while a substantially stiff underlying layer is provided to support the surface layer and absorb the general displacement of material which occurs when the plate is formed.

The laminated tablet structure is particularly desirable where the molding form comprises set-up type, that is to say, where some or all of the molded impressions are relatively deep. In such cases it is desirable to supply a backing layer to support the moldable layer and to absorb at least a part of the general impression. Where the tablet is to be shipped after molding, a backing of relatively strong material is also desirable to prevent distortion to the molded tablet during transportation.

A relatively stiff backing layer is preferable even where only fine impressions are to be made in order to support the relatively soft portions forming the molding surface and prevent distortion thereof during the stripping of the molded tablet from the molding form or matrix and during the subsequent handling of the tablet after molding.

In the illustrated embodiment, the tablet is shown as comprising a backing 13 and a moldable layer 15, the backing being preferably of relatively thin, resilient sheet material having an appreciable stiffness in order to form a resilient support for the layer 15. The backing should not be so stiff as to be inflexible but should permit slight bending without permanent distortion while, at the same time, be stiff enough to provide substantial support for the relatively flexible and mechanically weak layer 15. The backing also should be deformable in a press to take a permanent set in conformity with the general configuration of the press and when so deformed retain its resilient layer supporting characteristics.

I prefer to form the backing 13 of annealed aluminum sheets approximately .006 of an inch thick. In certain cases, depending somewhat upon service requirements, satisfactory results may be had by applying the layer 15 to a backing formed of cardboard paper or sheet copper, and I do not wish to limit the invention to any specific backing material but any thin sheet having the requisite resilient stiffness and deformability may be utilized, or, in some instances heretofore explained, eliminated entirely. Where a backing is used however, the molding layer 15 need not have the mechanical strength necessary when the molding layer is unsupported. I have discovered that a molding composition, including balata or rubber gum and certain waxes and resins, has certain desirable characteristics when used with a backing layer. The compound, containing balata or rubber, is comparatively inelastic and tough when cold and can be molded in substantially cold condition to accurately receive a specific impression of the finest texture used in printing. The molding composition, however, when hot, is fluid enough to permit the same to be applied as a relatively thin, uniform layer, approximately .015 of an inch thick, to the backing sheet 13.

The balata or rubber ingredient has the characteristic of imparting toughness to waxes with which it is mixed so that by using balata or rubber as an ingredient, and I prefer to use Surinam sheet balata or standard rubber smoked sheet, although reclaimed rubber may also be used for the purpose, the wax ingredient is modified and toughened to the end that the molding composition is exceedingly tough while retaining the comparatively inelastic character of the wax. Apparently there is a change in the internal structure of the waxes, more than a mere mixing of ingredients, which produces a uniform, homogeneous, slightly flexible, yet inelastic and exceedingly tough molding material. Balata also is exceedingly sticky when hot and will maintain a bond, formed while hot, even after cooling to a non-sticky condition. This characteristic appears to an extent in the resulting composition so that if applied to the plate 13, while hot, the layer 15, after cooling, adheres strongly because of the balata ingredient.

I prefer, however, to utilize an adhering or bonding layer 14 between the moldable layer and the backing sheet, particularly where the backing sheet is of metal and the compound includes rubber, since rubber is not as adhesive as balata. Even where balata is used in the molding compound, a bonding layer 14 is desirable. This adhering layer is preferably an emulsion of asphalt in water. The emulsion is thinned to brushing consistency and applied as a uniform thin coat with a scraper after which heat is applied to evaporate the water, leaving a water insoluble asphalt coating of uniform thickness over the entire area of the backing sheet. With this coating, which firmly adheres on the smooth surface of the metallic backing sheet, the moldable rubber and wax compound will form a firm bond. The asphalt, I prefer to use for the bonding coating, is a dispersion of asphalt in water, using four percent clay as an emulsifying agent. Alternatively, a solution of asphalt in benzine or gasoline may be used instead of the aqueous emulsion.

I may, in some cases, form the bonding layer 14 by using a bonding solution comprising balata gum and a resin, such as cumarone. This is applied warm to the plate 13 and adheres more strongly after cooling than does by molding compounds. This bonding layer 14 forms a base to which the layer 15 will adhere even more tenaciously than if applied directly to the plate.

For the wax ingredient of the molding composition, whether the main ingredient is rubber or balata, I prefer to use a mixture of beeswax and carnauba wax, since these are not only moldable but beeswax has adhesive characteristics which are retained in the composition to assist in holding the layer 15 on the plate 13 while the carnauba wax is of unctuous character and makes the matrix easy to pull out of the molded plate. Any other wax or waxes providing these characteristics may, of course, be used. Paraffin, preferably of the softer grades, and other waxes, such as ozokerite, may be used for the purposes.

The resin ingredient is preferably paracumarone resin and is to impart additional adhesiveness in the composition without destroying its toughness or rendering it elastic. Other suitable resins, adapted to render the composition adhesive, may, of course, be substituted for the paracumarone resin.

A filler, such as zinc oxide or silica, or other suitable material for toughening the composition, may be used, although not essential.

As a preferred example of a compound, using balata as the main ingredient, I may make the composition by mixing the ingredients in accordance with the following formula:

| | Parts by Weight |
|---|---|
| Balata gum | 6 |
| Paracumarone resin | 3 |
| Beeswax | 3 |
| Carnauba wax | 2 |
| Zinc oxide | 7 |

As a preferred example of a moldable compound, using rubber as the main ingredient, I make the composition by mixing the ingredients in accordance with the following formula:

| | Parts by Weight |
|---|---|
| Smoked sheet rubber | 7 |
| Paracumarone resin | 3 |
| Ozokerite | 5 |
| Paraffin (M. P. 134° F.) | 3 |
| Powdered silica | 21 |

The molding composition, using rubber, is preferable to that using balata because of less tendency to be affected by heat as far as contraction and expansion is concerned and because of greater ductility through a wide range of temperature. The balata composition, while molding satisfactorily under normal temperature conditions, tends to become brittle at freezing temperatures. The rubber composition is more cleanly and is above all a standard product while balata varies considerably in composition, quality and available supply.

Reclaimed rubber may also be used as a substitute for the smoked sheet rubber, the latter being specified as a well known rubber standard of negligible variation in quality. Smoked sheet rubber is derived from latex as gathered from the rubber tree. The latex is strained to remove impurities and the rubber content precipitated out with acid. The rubber precipitate is then milled out in sheets of approximately ⅛ inch in thickness and smoked.

The ingredients, whether rubber or balata is used, are mixed together as in a rubber mill and the composition is immediately ready for use. It may be applied to the backing plate simply by flowing the moldable material as a layer 15 onto the backing layer 13, which has preferably previously had a film of suitable adhesive material applied thereto to form a bonding layer 14. The backing layer with the layer 15 thereon is then passed between squeezing rollers which are adapted to cool and solidify the molding compound, and, at the same time, form the layer 15 to uniform thickness of the order of .006 inch throughout the extent of the tablet. Upon cooling, the composition adheres to the backing plate with such tenacity as to prevent separation unless the layers are forcibly and intentionally stripped apart.

After the layer 15 has been applied, a thin film or skin 16 of a suitable electrical conducting material, preferably in finely divided form and preferably substantially less than .0005 inch in thickness, is applied to the exposed or impression-receiving surface of the layer 15. This skin may be formed as a layer of powdered graphite which is brushed on to the surface of the layer 15. The graphite may be applied, in the case of a layer comprising rubber, almost immediately after the layer cools but where the layer 15 comprises balata, it is preferable to permit the layer to set for an appreciable period, say twenty-four hours, before the graphite is applied.

By forming a conducting layer of substantially less than .0005 inch in thickness, I am able to provide for molding the finest reproducible printing impression, i. e., a "shadow dot" which is of the order of .0005 inch in width and depth without appreciable resistance to molding by the internal friction of the conducting layer. The conducting layer is merely forced into the depression by lateral bending. The impression is not made in the layer itself and consequently the molding pressure does not have to be increased to overcome the internal friction of the layer material, it being merely necessary to bend the layer material into the depression formed in the relatively soft material of the layer 15. Consequently, the molding pressure required is merely that required to internally deform the material of the layer 15. By using graphite, moreover, a substantially uniform conducting film or skin is formed over the entire surface of the moldable layer, and the graphite flakes of the conducting layer will slip during the molding process and thus be forced more easily into the molded impressions covering the bottoms as well as the sides thereof and promoting the rapid formation of a plated shell when the molded tablet is immersed in a plating bath. Graphite, moreover, parts readily from the plated shell without leaving any materials on the surface of the shell, which might form blemishes in the finished electrotype. Any graphite adhering to the shell may be brushed off and even if not removed will not form spots or blemishes in the electrotype.

I prefer also to apply a parting layer 18 in the moldable layer behind the electrical conducting skin 16, especially where the latter is formed of graphite, in order to facilitate stripping the tablet from the shell. It is preferable to use, as a parting medium, a material which has no reaction with the electroplating path in which the formed tablet is immersed during the plating process. A parting material, which will react to the plating operation, will cause blisters in the plate as well as pitting due to current reversals set up by the electrolytic action of some metals. To this end, therefore, the parting layer preferably comprises metallic powder, such as copper or copper-bronze, although other materials, such as powdered mica materials, may be used. The parting material is brushed onto the surface of the moldable material and adheres very uniformly to the natural surface of the composition.

The conducting layer 16 may then be applied upon the parting layer 18. In some instances, particularly where graphite is used in the conducting layer, an adhesive solution 20 is necessary between the parting and electrical conducting layers since graphite does not readily adhere to the parting material. For this purpose, a number of adhesive compounds are available, such, for instance, as a solution of stearic acid in alcohol, but I prefer to use an aqueous emulsion of wax, preferably carnauba wax. I prefer also to include an animal oil in the emulsion since I find that the animal fat helps in the releasing operation.

I have found that the following composition is especially effective as an adhesive for the purpose mentioned:

*Solution A*

| | | |
|---|---|---|
| Water | cubic centimeters | 125 |
| Triethanolamine | grams | 3 |

*Solution B*

| | | |
|---|---|---|
| Carnauba wax | grams | 18 |
| Butter fat | do | 6 |
| Stearic acid | do | 3 |

Solution A is warmed to approximately 212° F., Solution B is melted together and poured into the warmed Solution A at approximately the same temperature, viz: 212° F. Thirty-five cubic centimeters of ethyl-alcohol is added as the mixture cools. The resulting mixture is spread evenly as with a brush, felt pad or other suitable applicator over the parting layer and allowed to dry. To this, the graphite, forming the conducting layer, adheres evenly with a firm bond.

In Figures 11 through 15, I have shown apparatus for building up my improved molding tablet as a continuous process. In this apparatus, the sheet, forming the backing 13, is progressively advanced through devices adapted to apply the several coatings or layers.

In the preferred form of the apparatus shown in Figure 11, the sheet is passed through a device 46 for applying the bonding layer 14, an oven 52 for drying the bonding layer, a device 58 for applying the moldable layer 15, a layer cooling and spreading device 62, a brushing device 76 for applying the parting layer 18, a flashing oven for producing an adhesive layer 20 above the parting layer and a brushing device 82 similar to the device 76 for applying the conducting layer 16. In the alternate apparatus, shown in Figure 12, the flashing oven 80 is replaced by a device 86 for spreading a coating 20 of adhesive material above the parting layer.

The sheet material, forming the backing 13, is preferably arranged in the form of a roll 41 at or near the inlet end of the apparatus, and is drawn from the roll around a guide roller 43, a preferably flat friction spring or other pressing device 45 being utilized to hold the strip snugly against the roller. After passing the roller 43, the sheet enters the device 46, which comprises a reservoir 47 containing a material adapted to form the bonding layer 14. In passing through the reservoir 47, the strip 13 passes over and is supported by a preferably heated backing plate 49, the reservoir being erected above the plate 49 so that the bonding material is applied to the upper surface of the sheet 13 as it travels through the reservoir. The backing plate 49 is preferably inclined so that the sheet enters at the lower end of the reservoir through a slot in the walls thereof sufficiently wide to admit the sheet 13 while preventing the escape of the bonding material, and the sheet passes out through an outlet opening in the upper portions of the reservoir at the upper end of the backing plate 49, the edges of the reservoir casing defining the outlet opening forming a scraper 51 as shown in Figure 13, permitting the sheet 13 to carry a substantially uniform layer of the bonding material with it through the opening 51. After passing from the reservoir 47, the strip 13, carrying with it a layer 14 of the bonding material, passes into a warming oven 52 comprising a casing 53 including heaters 55 for the purpose of evaporating the moisture content of the bonding material. At the upper end of the casing 53, the sheet travels over a roller 57 and receives a layer of moldable material 15 from the spreading device 58 which preferably comprises a reservoir having an outlet 59 disposed immediately above the roller 57. The roller 57 may be journaled as shown in the side walls of the case 53 and the casing is preferably arranged to partially enclose the reservoir 59 so that the heat rising through the casing 53 from the heaters 55 may serve to warm the material contained in the reservoir 59 and keep the same sufficiently fluid for application to the sheet as it travels around the roller 57.

The reservoir 59 also has an adjustable opening defined by a scraper or spreader member 61 shiftably mounted on the walls of the reservoir 59 so that the lower edge of the scraper member 61 may be positioned at a determinable distance above the upper surface of the sheet 13 as the same passes around the roller 59 in order to vary the thickness of the layer of moldable material which is permitted to escape from the reservoir on the sheet 13 as the same passes the opening 59.

After the moldable material is applied in this fashion, it passes between two rollers 63, which serve the triple purpose of working and distributing the material more accurately and uniformly than can be accomplished by the scraper 61, of removing bubbles which may be present in the material as it leaves the reservoir 59 and of cooling the layer.

In order to cool the plate 13 and its applied layer 15 as it passes the rollers 63, I interpose between the sheet and the lower roller 63, that is to say, the roller that faces the back or uncoated surface of the backing sheet 13, a relatively large metallic cylinder 65 around which the strip travels in passing between the rollers 63. This cylinder dips into a cooling bath 67 and serves to chill the plate 13 and the layer 15. The uppermost of the rollers 63, that is to say, the roller which engages the layer 15, is preferably cooled artificially as by circulating water and is also wetted with a solution applied to the surface of the roller from a reservoir 69 through the intermediary of solution-applying rollers 71. This wetting solution is preferably composed of one part of alcohol and eight parts of water with three percent of a suitable alkali, such as ammonia. The purpose of the wetting solution is to prevent adhesion between the surface of the layer 15 and the forming roller 63. The cooling solution 67, into which the cooling cylinder 65 immerses during its rotation, is also preferably a wetting solution in order to prevent adhesion between the cooling cylinder 65 and any of the material of the layer 15, which may be squeezed out laterally beyond the edges of the backing strip 13 and thus come in contact with the cooling cylinder 65. The coated strip 13 leaves the cooling cylinder 65 by passing around the guide roller 73 and passes into the parting layer applying device 76, which comprises a supporting plate 75 above which is mounted a brush 77 or other suitable device for applying powdered material upon the upper surface of the moldable layer 15. As heretofore described, I prefer to utilize, as a parting material, powdered copper, copper-bronze, powdered mica, or any suitable parting material which is substantially inert to the action of the plating bath. The brush 77 is preferably enclosed in a housing 79 and is partially enclosed within the housing by means of a baffle 81. The brush rotates preferably in the direction shown by the arrow in Figure 11 so that the powdered material is continuously thrown over the baffle 81 and dropped through the channel 83 upon the upper surface of the moldable layer as the strip is advanced beneath the brushing device. The brush then presses the material onto the upper surface of the moldable layer to form a layer of the parting material on the upper surface of the moldable layer substantially as shown in Figure 16 of the drawings, the excess of material being brushed off and delivered in the casing 79 into the channel 83 as heretofore mentioned.

After leaving the brushing device 77, the strip is delivered through the devices for applying the conducting layer 16.

As heretofore described, I prefer to use graphite as the conducting material and since graphite will not readily adhere to the powdered bronze of the parting layer, I may form an adhesive coating or layer 20 upon the parting layer before applying the conducting layer. This may be accomplished by flashing the surface of the sheet by passing it through an oven 80 as shown in Figure 11. The flashing oven is simply a device for heating the surface of the strip to cause the same to flow slightly. This will cause the material of the parting layer to become embedded slightly below the upper surface of the moldable layer 15 substantially as shown in Figure 17 of the drawings.

Where it is desired to apply a separate adhesive coating above the parting layer instead of flashing the surface, the sheet, after emerging from the brushing device 77, may be passed through an adhesive applicator 86, comprising a roller 87, above which is mounted a reservoir 89 containing a suitable adhesive compound, the reservoir having a discharge opening 91 across which the upper surface of the sheet is carried in passing around the roller 87. As the sheet is carried past the discharge opening of the reservoir 89, the film 20 of adhesive material is deposited upon the upper surface of the sheet substantially as shown in Figure 18 of the drawings by means of the brushing or wiping devices 93 mounted at said discharge opening. After passing from between the roller 87 and the adhesive-applying device 93, the sheet is preferably passed through a drying oven or similar device in order to dry the adhesive coating and to produce the structure shown in Figure 18. Graphite for the conducting layer may be applied to the upper surface of the sheet as it comes from the flashing oven 80 or the adhesive-applying device 86 by means of a brush 83 mounted above a supporting plate 85 and including a casing 87 and baffle 89 substantially similar to the brush 77 and its associated baffle and support plate, in order to produce the final product substantially as shown in Figure 19. The finished product may be cut in strips as it is delivered from the building apparatus, or may be rolled up as shown at 99.

In order to use the tablet in the preparation of electrotypes, a sheet of the material is arranged preferably on a somewhat resilient block 17 in a press 19, the tablet being arranged with the layer 15 facing upwardly. A form 21 of any suitable character is deposited face downwardly upon the tablet and the press actuated to force the matrix into the layer 15. It is not necessary to utilize excessive pressures in order to form the tablet but pressures, such as are ordinarily used in the pressing of the ordinary wax tablets may be employed. It is not, however, necessary to heat the tablet of my present invention before pressing it as is the case with the ordinary wax tablets. After being impressed with the image to be reproduced, the tablet has an impression substantially as shown in Figures 4 and 5 of the drawings and it will be noticed that the resilient block 17 permits the backing plate 13 to receive general deformations conforming substantially with the specific impressions received by the layer 15, and promotes the bonding effect between the layer 15 and the backing plate so that the chances of separation of the layers 13 and 15, after the tablet has been pressed into the desired configuration, are substantially lessened.

The material behind the depressions formed in the tablet is thus removed from the zone where the specific impression is received and thus relieves the internal pressure set up in the tablet which, if not relieved, would result either in the rebounding of the impression upon removal of the molding pressure, or in raising the surface of the tablet between the depressions which is known as "building". In either case, the final resulting impression would be untrue. By absorbing the internal pressure by permitting it to deform the entire tablet throughout its thickness so that the reverse side of the tablet also has the general contour of the form, the specific impression on the obverse side of the tablet is preserved exactly as molded by the form.

It is not, of course, essential entirely to eliminate building between the depressions formed in the tablet. A certain amount of building is desirable, especially where the space between depressions is of relatively large area. The tablet of my invention permits limited uniform building between depressions. Excessive building, however, is eliminated by keeping the layer thin to thus permit the entire tablet to be deformed and by maintaining the toughness of the material sufficient to prevent the material flowing freely from under the raised portion of the form and squirting up between the depressions of the tablet. The amount of building may be regulated by controlling the relative fluidity of the material forming the layer 15. If a greater building is desired, a larger proportion of wax, more particularly the unctuous wax ingredient, should be used in preparing the molding material. Where the surface layer 16 is in the form of a thin sheet, the layer acts as a skin and eliminates excessive "building" and equalizes the building throughout the tablet.

It will be noted that the tablet may receive simultaneously type impressions 23 as well as the relatively finer impressions 25, such as are made by etchings, engravings, half-tones, and the like. In other words, the tablet of my present invention is adapted to receive impressions from a "mixed form", that is to say, a form including type characters and portions adapted to make relatively fine impressions, and this advantage, as has heretofore been pointed out, is not present where the lead tablet is used, and even though a mixed form can be molded in a wax tablet, the impression in wax is not as accurate nor as fine as may be had if the teachings of my present invention are followed.

In Figure 20, I have shown a device for molding the sheet material to make electroplate molds or mats in a continuous fashion, thus illustrating one of the inherent valuable characteristics of the molding sheet. This process, which is itself new, is particularly adapted to produce molds in quantity.

The finished molding sheet, as it is delivered from the fabricating apparatus shown in Figures 11 and 12, may be delivered directly into the continuous molding apparatus shown in Figure 20, or may be stored for any length of time and/or transported to a molding station and then delivered to the molding machine. The molding machine in essence comprises a pair of rollers, one of which 101 carries one or more molding forms 121 corresponding to the form 21 of the flat discontinuous press shown in Figure 3. The other roller 103 has a resilient portion, such as a layer of rubber 117 corresponding to the layer 17 of the discontinuous molding press. In the illustrated embodiment, the layer 117 is shown as an idle endless belt which is carried on the roller 103. Any suitable means may be provided for adjusting the spacing between the centers of the rollers 101 and 103 and yielding means 105 is preferably provided to hold the rollers in adjusted, spaced-apart positions, means being also preferably provided for adjusting the tension of the yielding means. The finished moldable sheet is fed between the rollers 101 and 103 with its bucking side 13 facing the yielding material 117 and its moldable surface facing the roller carrying the pattern forms 121 so that the sheet is molded in accordance with the pattern forms 121 as it passes between the rollers. The sheet tends to adhere to the pattern forms and to follow the roller 101 and may be continuously stripped from the roller by suitable automatic stripping means comprising, in the illustrated embodiment, a roller 107 preferably having a yielding surface to prevent injury to the molded face of the sheet, said roller 107 being driven with a surface speed equal to the rate of travel of the molded sheet.

The sheet of my present invention may be continuously molded as above described because of the fact that it is substantially self-sustaining yet flexible enough to follow the roller 101 and because only low molding pressures are required to impress or emboss the moldable sheet.

After being impressed, the specifically formed surface of the layer 15 may be additionally hand-polished with graphite if necessary and then electroplated simply by immersing it in a suitable plating bath 27, which may best be accomplished by fastening the formed tablet on a holding plate 29, preferably of lead, the tablet being attached to the lead plate by means of the tacks 31, and the plate suspended by means of a holder 33 from the bar 35. Where the layer 16 is in the form of a metallic sheet, it is, of course, unnecessary to polish with graphite, since the sheet metal layer 16 affords an ample conducting medium so that the entire impressed surface of the tablet commences to receive a plated shell as soon as it is deposited in the plating bath.

As is well understood in the electroplating art, an electric potential is applied between the bar 35 and the fluid forming the plating bath, carrier member 29 being insulated so that the bath will not deposit metal upon the carrier member 29, but only upon the graphitized surface of the layer 15, the graphitized surface, being electrically connected by means of the tacks 31 through the metallic portions of the carrier member 29 and the hanger 33 to the bar 35 and being exposed to the fluid of the plating bath, will receive a coating of metal.

Where a metallic backing 13 is used, the edges of the backing, being exposed to the plating fluid and electrically connected to the bar 35, because the tacks 31 pass through the backing, provide an excellent contact all around the tablet which facilitates the initial deposit of the plated metal at the edge of the tablet from whence the plated metal spreads inwardly, finally covering the entire surface of the tablet.

After the plating process has been carried on sufficiently to deposit a metallic film of proper thickness upon the graphitized surface, the tablet may be removed from the plating bath and the deposited film stripped from the tablet.

The stripping operation is illustrated in Figure 7 of the drawings and after the electroplate 37 has been removed from the tablet, it may be cleaned and backed with lead 39 as shown in Figures 8 and 9, or finished in any usual manner for use in a printing press.

An important advantage flowing from my present invention is that the tablet will receive, accurately and at relatively low molding pressures, the impression made by a matrix including type as well as the relatively fine impressions made by etchings, engravings, half-tones, and similar forms and on account of the resilient stiffness of the backing will retain the impressions undistorted even when subjected to moderately rough handling. It is not possible to accomplish this with either lead or wax tablets of the ordinary sort, since wax does not accurately take the relatively fine impressions made by etchings, half-tones, and the like, while the pressure required to impress etchings, half-tones, and the like on lead plates is so great as to break or otherwise damage the relatively large type forms. In addition, wax tablets will not retain their impressions undistorted unless carefully handled in fabrication and use and cannot be transported by common carriers while even lead plates require careful handling and special packaging for commercial transportation.

Another important advantage resides in eliminating the expense of wax tablets which require space-consuming apparatus in the shop and also consume the operator's time.

A further important advantage is the elimination of the expense of the relatively heavy lead tablets by the provision of a lightweight tablet which incorporates the advantages of both wax and lead tablets and which eliminates the disadvantages of both. My tablet being relatively light in weight, can be shipped at much less cost than the relatively heavy lead tablets and can be shipped safely to the electroplater after being impressed, while wax tablets, for practical considerations cannot be shipped at all but have to be molded where fabricated and electroplated where molded. My tablet also will take an impression of a fineness and accuracy equal to that accomplished on a lead tablet, at pressures comparable to those required in molding wax tablets so that the relatively expensive, high-pressure molding apparatus now required in pressing lead tablets may be eliminated entirely.

It is thought that the invention and numerous of its attendant advantages will be understood from the foregoing description and it is obvious that numerous changes may be made in the form, construction, and arrangement of the several parts without departing from the spirit or scope of my invention, or sacrificing any of its attendant advantages, the forms herein described being preferred embodiments for the purpose of illustrating my invention.

Having thus described my invention, what I claim as new and desire to secure by Letters Patent is as follows:

1. A moldable tablet for use in the preparation of electrotype, comprising a sheet of aluminum of predetermined stiffness, a binding film on a surface of the sheet, a layer of moldable material secured to the sheet by said binding film, and a parting layer in the exposed surface of the moldable material.

2. A moldable tablet for use in the preparation of electrotype, comprising a sheet of aluminum of predetermined stiffness, a binding film on a surface of the sheet, a layer of moldable material comprising a wax, a gum, a resin, and a filler.

3. A moldable tablet for use in the preparation of electrotype, comprising a sheet of aluminum of predetermined stiffness, a layer of moldable material secured to the sheet, and a parting layer in the exposed surface of the moldable material.

4. A moldable tablet for use in the preparation of electrotype, comprising a sheet of aluminum of predetermined stiffness, a layer of moldable material secured to the sheet whereby the tablet may be molded throughout its entire thickness, including the aluminum sheet, to the general contour of a master pattern while receiving the specific configuration of the pattern in the exposed surface of the moldable material.

5. A moldable tablet for use in the preparation of electrotype, comprising a sheet of aluminum of predetermined stiffness, a layer of moldable material secured to the sheet whereby the tablet may be molded throughout its entire thickness, including the aluminum sheet, to the general contour of a master pattern while receiving the specific configuration of the pattern in the exposed surface of the moldable material, and a parting material at the surface of said moldable layer to facilitate release of the master pattern transformed after molding.

6. A moldable tablet for use in the preparation of electrotype, comprising a sheet of aluminum and a layer of plastic moldable material adhered upon the sheet, the material of said sheet having predetermined resilience such that the sheet will normally support the layer substantially against permanent distortion through bending under the effect of its own weight and through accidental deflection in use, the material of said sheet also being sufficiently malleable to permit the tablet to be molded throughout its entire thickness, including the aluminum sheet, to the general contour of a master pattern, without rebound in the sheet, while receiving the specific configuration of the pattern in the exposed surface of the moldable layer.

7. A moldable tablet for use in the preparation of electrotype, comprising a relatively thin metallic sheet and a layer of moldable material adhered on the sheet, the material of said sheet being annealed to produce a predetermined ratio between resilience and malleability such that the sheet will normally support the moldable layer substantially resiliently against permanent distortion, the material of said sheet however being substantially malleable to permit the tablet to be molded throughout its entire thickness, including the metallic sheet to the general contour of a master pattern, without rebound, while receiving the specific configuration of the pattern in the exposed surface of the moldable layer.

8. A moldable tablet as set forth in claim 7, wherein the layer of moldable material comprises a wax, a gum, a resin, and a filler material.

9. A moldable tablet as set forth in claim 7, wherein the material of the moldable layer comprises balata gum and a wax.

10. A moldable tablet as set forth in claim 7, wherein the material of the moldable layer comprises rubber and a wax.

11. A moldable tablet as set forth in claim 7, wherein the material of the moldable layer comprises a resilient gum and a wax.

12. A moldable tablet as set forth in claim 7, wherein the material of the moldable layer comprises a wax ingredient approximately 22% by weight, a resilient gum approximately 22% by weight, a resin approximately 11% by weight, and a filler material approximately 45% by weight.

13. A moldable tablet of the type employed in the making of typographical matrices, comprising a backing layer comprising a sheet of metal and a moldable surface adhering thereto, said surface comprising an intimate mixture of wax and rubber, said ingredients being proportioned to provide a requisite degree of toughness and elasticity to permit accurate, substantially cold molding thereof in contact with a printing form.

14. A moldable tablet for use in the formation of typographical matrices, comprising a sheet tablet having a moldable surface comprising an intimate admixture of wax and rubber, less than one-half of the wax-rubber content comprising rubber, said moldable surface being supported by a relatively rigid backing layer of sheet metal.

15. A moldable tablet for use in the preparation of electrotypes, comprising a malleable, metallic sheet, and a layer of moldable material secured to the sheet whereby the tablet may be molded throughout its thickness to the general contour of a master pattern while receiving the specific configuration of the pattern in the exposed surface of moldable material, said moldable layer comprising an intimate mixture of a wax and rubber, balata or the like.

16. A moldable tablet for use in the preparation of electrotypes, comprising a malleable metallic sheet, and a layer of moldable material secured to the sheet whereby the tablet may be molded throughout its thickness to the general contour of a master pattern while receiving the specific configuration of the pattern in the exposed surface of the moldable material, said moldable layer comprising an intimate mixture of a wax and rubber, less than one-half the mixture being rubber.

17. A tablet of the type employed in electrotyping for the production of a matrix by molding in contact with a printing form, said tablet having a supporting layer comprising a sheet of metal and a moldable surface comprising a composition containing wax and rubber intimately mixed.

18. A tablet of the type employed for the production of a matrix by molding in contact with a printing form, said tablet having a supporting layer comprising a sheet of relatively rigid metal and a moldable surface supported thereby comprising a composition containing wax and rubber or balata, intimately mixed.

19. A moldable tablet of the type employed in the making of typographical matrices by molding in contact with a printing form, comprising a backing layer having sufficient mechanical strength and stiffness to form a support, said backing layer having substantially uniform resistance to deformation in all directions in its plane, and a moldable surface adhering thereto, said surface comprising an intimate mixture of wax and rubber, the rubber being present in a quantity less than that of the wax, said ingredients being proportioned to provide a requisite degree of toughness and elasticity to permit accurate, substantially cold molding thereof in contact with a printing form, said moldable surface layer being formed on the said layer without substantial impregnation thereof.

20. A moldable tablet for use in the formation of typographical matrices, comprising a relatively thin, flexible sheet tablet having a moldable surface comprising an intimate admixture of wax and rubber, less than one-half of the wax-rubber content comprising rubber, said moldable surface being supported by a layer of fibrous sheet material, said sheet material having the fibers arranged in random directions and having sufficient mechanical strength to provide a backing therefor, said moldable surface being formed on the surface of said fibrous layer without substantial impregnation thereof.

21. A moldable tablet for use in the preparation of electrotypes, comprising a continuous supporting sheet formed of a fibrous material in which the fibers are arranged in generally random directions, and a layer of moldable material supported by the sheet whereby the tablet may be molded throughout its thickness to the general contour of a master pattern while receiving the specific configuration of the pattern in the exposed surface of the moldable material, said moldable layer comprising an intimate mixture of a wax and rubber, less than one-half of the mixture being rubber, said moldable layer being formed on the said fibrous layer without substantial impregnation thereof.

HERBERT LIBBERTON.